Nov. 13, 1934.         M. TIBBETTS              1,980,771
                       SLACK ADJUSTER
                     Filed Nov. 17, 1931
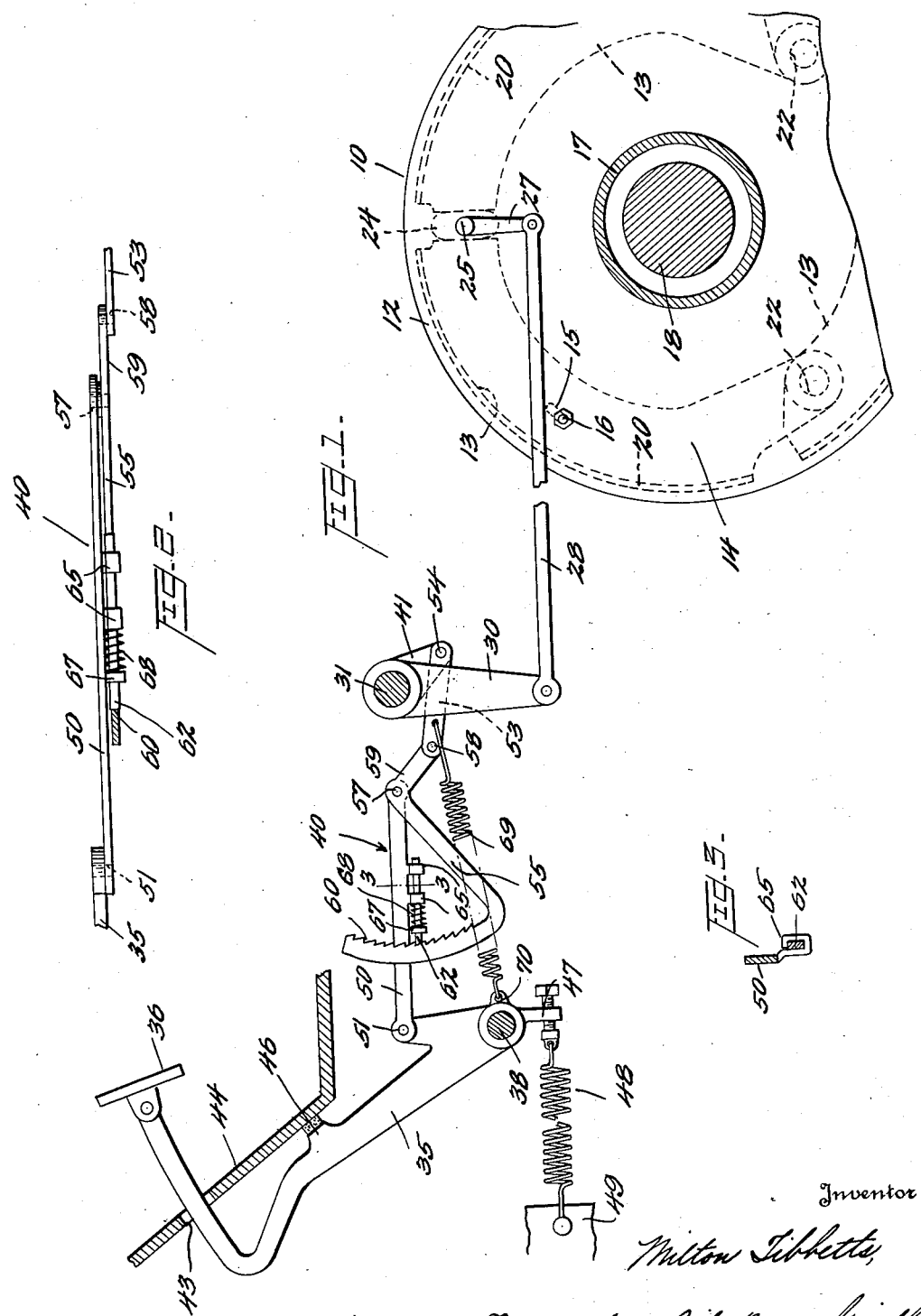
Inventor
Milton Tibbetts Patented Nov. 13, 1934

1,980,771

UNITED STATES PATENT OFFICE 1,980,771

SLACK ADJUSTER

Milton Tibbetts, Detroit, Mich., assignor to Packard Motor Car Company, Detroit, Mich., a corporation of Michigan Application November 17, 1931, Serial No. 575,669

11 Claims. (Cl. 188—196)

This invention relates to control mechanism for motor vehicles and has for its object the provision of means automatically adjustable to compensate for wear between the cooperating parts of such mechanism.

It is customary, for instance, to provide a control member comprising a pedal for brake operation, the control member being connected directly to the brake shoes by linkage or alternatively with fluid operating devices which are in turn associated with the brake shoes. As wear occurs between the various elements of the linkage, it is necessary to shorten the effective length of the linkage to ensure proper operation of the brake on relatively small movement of the operating member. It has heretofore been proposed to provide means for automatically shortening this linkage connection to compensate for wear but owing to the ease with which the adjustment may be made manually there is little point in providing an automatic slack take-up device which is not extremely simple and inexpensive to produce.

It is therefore an object of the present invention to provide means acting automatically to shorten the effective length of linkage in vehicle control mechanism which can be cheaply produced and readily installed regardless of the type of control mechanism employed. It is a feature of the invention that the device in question may be substituted for a single link in the control mechanism and may consist primarily of sheet metal stampings.

Further objects and features of the invention will be apparent from the following description taken in connection with the accompanying drawing, in which Figure 1 is an elevational view of brake control mechanism to which the invention has been applied;

Figure 2 is a plan view of a portion of the mechanism shown in Figure 1; and

Figure 3 is a section on the line 3—3 of Figure 1.

While the brake control mechanism is illustrated and described in detail herein for the purpose of facilitating an understanding of the principles of the invention, it will be understood that no restriction of the scope of the invention is intended thereby, but that various changes and alterations in the details of this mechanism are contemplated. For instance, the invention is shown as applied to brake control mechanism of the purely mechanical type but it will be apparent from the following description that the invention is similarly applicable to brake control mechanism of different type and mechanisms for effecting control of devices other than a vehicle brake.

Referring now specifically to the drawing, it will be observed that the brake mechanism per se is indicated generally at 10 and consists of a drum 12 mounted for rotation with the vehicle wheel, not shown, and arranged to be engaged internally by a plurality of brake shoes 13 suitably supported within the drum and occupying positions relatively fixed with respect to the vehicle wheel and other rotating parts. For instance, the brake shoes 13 may be slotted as indicated at 15 and bolts 16, mounted in a stationary disc 14 which is in turn secured to the axle housing 17, may be passed through the slots 15, the axle being designated by the reference numeral 18. Each brake shoe is provided with a friction lining 20 and the several brake shoes are provided with articulated connections 22. The shoes are urged outwardly into engagement with the braking surface of the drum 12 by means of a cam 24 mounted on a spindle 25 which is in turn supported in the relatively stationary disc 16. An arm 27 is secured to the spindle 25 and is connected by means of a link 28 to an arm 30 which is in turn secured to a shaft 31 rotatably mounted in the vehicle frame.

An operating member 35 comprising a pedal having a foot engaging portion 36 is mounted for limited oscillatory movement on a shaft 38 carried by the vehicle frame and is connected by a link member designated generally by the reference numeral 40 with an arm 41 secured to the shaft 31. The pedal 35 projects through an opening 43 in the floorboard 44 and is provided with a stop portion 46 arranged to engage the underside of the floorboard when released, an arm 47 on the pedal being connected by means of a spring 48 to a portion 49 of the vehicle frame, the spring normally retaining the pedal in elevated position as shown in Figure 1 of the drawing.

It will be observed that the control and brake mechanism thus far described is conventional and the details thereof are not material to the present invention except insofar as they act in combination with the automatically adjustable device about to be described. This device, indicated generally by the reference numeral 40, comprises a three-piece link member consisting of a link 50 pivoted at one end to the brake pedal at 51, a link 53 pivoted to the arm 41 at 54 and a connecting link 55 pivoted to the links 50 and 53 at 57 and 58 respectively. All three of these links may consist of flat sheet metal stampings, the links 50 and 53 being substantially straight and the link 55 preferably assuming the form shown in Figure 1 of the drawing and being provided with ratchet teeth 60 for cooperation with a spring pressed pawl 62 carried by the link 50. As illustrated in Figure 3 of the drawing, the pawl 62 may likewise be stamped from sheet metal and may be mounted on the link 50 by means of ears 65 struck up from one end of the latter. An abutment 67 is formed on the pawl 62 and a coil spring 68 surrounds the pawl between the abutment 67 and one of the ears 65 to normally maintain the pawl in engagement with the ratchet teeth 60. A coil spring 69 preferably acting between the link 53 and the link 50, for instance by being connected to the link 53 and to the pedal 35 at 70, is provided to urge the link 55 in a clockwise direction as shown in Figure 1, or in other words, to urge the toothed portion 60 of the link upwardly past the pawl 62, this movement being permitted by the direction of the ratchet teeth 60. Movement of the link 55 in the opposite direction is of course resisted by the cooperation of the pawl 62 and toothed portion 60 of the link.

The nature of the device will be apparent from the above description. When the portion 36 of the pedal 35 is engaged by the foot and depressed, the link 50 will be drawn to the left. The force applied to this link will be transmitted through the links 55 and 53 to the arm 41, thus rotating the shaft 31 and expanding the brake shoes 13 in a manner which is well understood. During the operation of applying the brake, the tension on the three-piece link member 40 will tend to cause rotation of the link 55 in a counterclockwise direction, that is to say, the portion 59 of the link 55 intermediate the points of connection 57 and 58 of this link with the links 50 and 53 will tend to move into alignment with the links 50 and 53. This movement is of course resisted by the cooperating ratchet teeth 60 and pawl 62 so that the link member 40 will act in applying the brake in precisely the same manner as would a simple link connecting the points 51 and 54 on the pedal 35 and the arm 41 respectively. When the pedal 35 is released, the spring 48 will restore the same to the position shown in Figure 1 with the abutment 46 on the pedal in engagement with the floorboard 44, and if no substantial wear has taken place in the brake or in the operating mechanism the relative position of the cooperating members of the link device 40 will not be altered.

If it be assumed that wear has taken place, for instance in the lining 20 of the brake shoes 13, and the connection between the pedal 35 and the brake is slack, the spring 69 will rotate the link 55 in a clockwise direction when the pedal 35 is released, thus moving the toothed portion 60 of the link 55 upwardly past the pawl 62 and moving the portion 59 of the link 55 downwardly to shorten the effective length of the connection between the arm 41 and the pedal 35. The link 55 will be held in the position to which it has been moved by the cooperation of the pawl 62 and toothed portion 60 of the link so that when the pedal is again depressed the link member 40 will still act in the same manner as a single link in the application of the brake, but by reason of the shortening of the effective length of this link, the brake will be applied at an earlier point in the downward movement of the pedal 35 than would occur if the automatic adjustment had not been effected.

It will be obvious from the foregoing description that the link device 40 may be employed as a substitute for an ordinary link in any linkage train and will act without any attention on the part of the operator to eliminate slack occurring by reason of wear of the component parts of the linkage.

Having thus described the invention, what is claimed as new and desired to be secured by Letters Patent is:

1. In a vehicle, the combination with the vehicle brake, of a control member, and means operatively connecting said control member and brake, said means including a pair of links, means connecting said links and movable with respect thereto, and resilient means for urging said link-connecting means in one direction to disalign said links to decrease the effective length thereof.

2. In a vehicle, the combination with the vehicle brake, of a control member, and means operatively connecting said control member and brake, said means including a tension member comprising three links having pivotal connection, and a spring associated with said links and tending to collapse the same.

3. In a vehicle, the combination with the vehicle brake, of a control member, and means operatively connecting said control member and brake, said means including a tension member comprising three links having pivotal connection, a spring associated with said links and tending to collapse the same, and means for retaining said links in partially collapsed position.

4. In a vehicle, the combination with the vehicle brake, of a control member, and means operatively connecting said control member and brake, said means including a tension member comprising three links having pivotal connection, resilient means associated with said links and tending to shift the same out of alignment, and means for positively resisting relative movement of said links toward a position of alignment.

5. In a vehicle, the combination with the vehicle brake, of a control member, and means operatively connecting said control member and brake, said means including a pair of tension members having pivotal connection with each other and with said brake and control member respectively, yielding means associated with said tension members and tending to move the same relatively to shift the points of pivotal connection thereof out of alignment, and means for resisting relative movement of said tension members toward a position in which the points of pivotal connection thereof are aligned.

6. A slack take-up device comprising a pair of members having pivotal connection and adapted to act as a single link in tension, a spring tending to shift said members relatively to displace the pivotal connection from the line of tensile force acting thereon, and means associated with said members for positively resisting relative movement of said members in the opposite sense.

7. A slack take-up device comprising a pair of members comprising sheet metal stampings, said members being pivoted together and being provided at points spaced from the point of pivotal connection thereof with means whereby a force in tension may be transmitted therethrough, resilient means associated with said members and tending to move the same relatively to shift the point of pivotal connection thereof away from the line of the transmitted force, and means for positively resisting relative movement of said members in the opposite sense.

8. A slack take-up device comprising a pair of members comprising sheet metal stampings, said members being pivoted together and being provided at points spaced from the point of pivotal connection thereof with means whereby a force in tension may be transmitted therethrough, resilient means associated with said members and tending to move the same relatively to shift the point of pivotal connection thereof away from the line of the transmitted force, and means for positively resisting relative movement of said members in the opposite sense, said last named means comprising a ratchet toothed portion on one of said members and a cooperating spring pressed pawl on the other of said members.

9. A slack take-up device comprising a pair of members comprising sheet metal stampings, said members being pivoted together and being provided at points spaced from the point of pivotal connection thereof with means whereby a force in tension may be transmitted therethrough, resilient means associated with said members and tending to move the same relatively to shift the point of pivotal connection thereof away from the line of the transmitted force, and means for positively resisting relative movement of said members in the opposite sense, said last named means comprising a ratchet toothed portion on one of said members, a cooperating spring pressed pawl on the other of said members, and a guide for said pawl comprising a lug struck out from the associated sheet metal member.

10. A slack take-up device for a linkage comprising a three part articulated link member adapted to be placed in tension, resilient means associated with said link member and tending to shift the component parts thereof out of alignment, and means for positively resisting movement of the component parts of said link member to aligned position.

11. In a vehicle, the combination with the vehicle brake, of a control member, and means operatively connecting said control member and brake, said means including a pair of links, means connecting said links and movable in one direction with respect thereto upon occurrence of slack to move said links away from aligned position to decrease the effective length thereof, and means for continually urging said second named means in the said direction.

MILTON TIBBETTS.